Feb. 3, 1942.  D. D. DEMAREST ET AL  2,271,795
VARIABLE LEVERAGE DEVICE
Filed Aug. 1, 1940
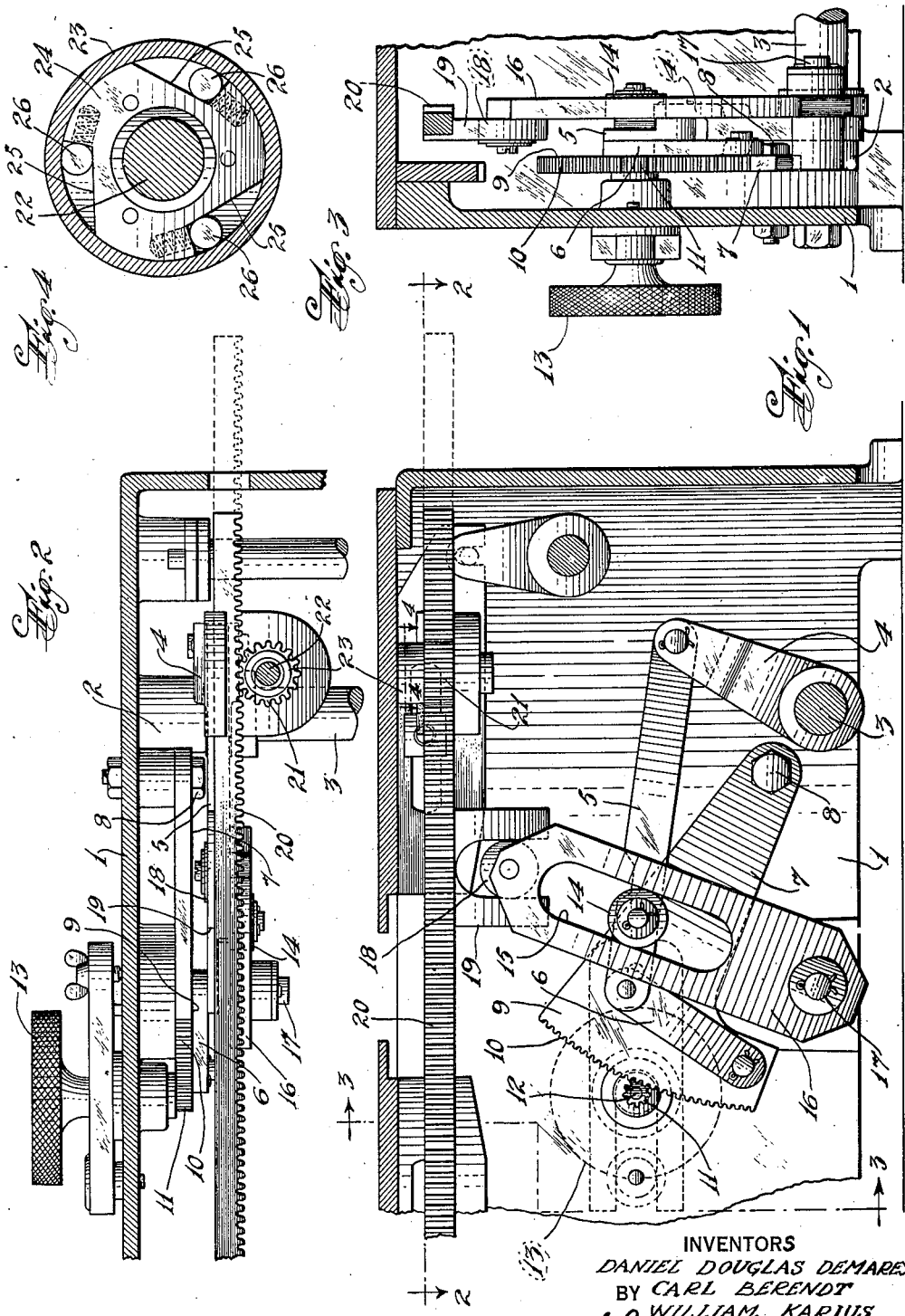
INVENTORS
DANIEL DOUGLAS DEMAREST
BY CARL BERENDT
WILLIAM KARIUS
Fredk C. Fischer, Atty.

Patented Feb. 3, 1942

2,271,795

UNITED STATES PATENT OFFICE 2,271,795

VARIABLE LEVERAGE DEVICE

Daniel Douglas Demarest, New York, N. Y., and Carl Berendt, East Orange, and William Karius, Irvington, N. J., assignors to Automatic Linker, Inc., Newark, N. J., a corporation of New York Application August 1, 1940, Serial No. 349,212

5 Claims. (Cl. 74—522)

This invention relates to variable leverage devices and more particularly to improvements in means for adjusting such devices.

The variable leverage device herein described is especially adapted for use in automatic sausage linking machines, such as described in application for U. S. Letters Patent, Serial No. 263,364, filed March 22, 1939. Inasmuch as speed and accuracy of operation are salient features of such machines, it is essential that they can be conveniently, accurately and rapidly adjusted to link sausages of different lengths. Such machines can be quickly adjusted to link sausages from 3 inches in length to eight inches in length, the adjustment being made by adjusting the length of an operating lever which controls the throw of sausage feeding means.

It is, therefore, an object of this invention to provide means for conveniently, accurately and rapidly adjusting a variable leverage device as used in automatic sausage linking machines.

A further object is the provision of an adjusting means for variable leverage device which enables very fine adjustments and positive operation at all times.

These and other advantageous objects, which will later appear, are accomplished by the simple and practical construction and arrangement of parts hereinafter described and exhibited in the accompanying drawing, forming part hereof, and in which:

Fig. 1 is an elevational view of an inner side wall of the end of a sausage linking machine embodying the invention, Fig. 2 is a sectional view taken on line 2—2 of Fig. 1, Fig. 3 is a sectional view taken on line 3—3 of Fig. 1, Fig. 4 is a sectional view taken on line 4—4 of Fig. 1.

Referring to the drawing, in Fig. 1 is shown the inner side wall 1 at one end of an automatic sausage linking machine. Journalled in bearings 2 mounted on wall 1 is an oscillatable shaft 3, operated by cam means (not shown). Fixed to shaft 3 is an arm 4, pivotally connected to a link 5, which is pivotally attached to a link 6, pivotally connected to an arm 7 pivoted at 8 to wall 1. The arm 7 is provided with a segmental portion 9 having a plurality of teeth 10, engaging a small pinion 11, fixed to a stub shaft 12 passing through wall 1 and attached to a circular operating handle 13 having a knurled edge.

Link 5 is provided intermediate its length with a roller 14 operating in a slot 15 in a lever 16 pivotally mounted on a stub shaft 17 projecting from wall 1.

The upper end of lever 16 is provided with a roller 18 engaging the sides of a saddle 19 fixed to a rack 20 engaging a pinion 21, attached to a stub shaft 22.

Positioned above pinion 21 is a collar 23 which is connected to a feed roll or the like (not shown) of a sausage linking machine. There is a one-way clutch connection between shaft 22 and collar 23 (see Fig. 4) comprising a member 24 attached to shaft 22. The member 24 has a plurality of cutout portions 25 adjacent collar 23. In the space between collar 23 and member 24 are positioned spheres 26. When the shaft 22 rotates in one direction the spheres 26 move freely with member 24; but when the shaft 22 rotates in the opposite direction, the spheres wedge in between member 24 and collar 23 to cause collar 23 to rotate with shaft 22.

In operation, the length of the lever 16 controls the throw of rack 20 and the extent of rotation of pinion 21 and shaft 22, thus controlling the feed rolls operated by collar 23. To adjust the device to provide strokes of different lengths, the handle 13 is rotated to cause the pinion 11 to operate upon the teeth 10 to move arm 7 up or down as may be desired, which raises or lowers the position of the roller 14 in slot 15 and thus changes the effective leverage of lever 16.

From the above description it will be seen that there has been provided a simple and effective device for accurately, conveniently and rapidly adjusting a variable leverage device in order to provide strokes of different length. While the device has been described in connection with an automatic sausage linking machine, it is obvious that the structure herein disclosed may be readily adapted for use in connection with feeding means in other types of machines, or in other situations where intermittent strokes in one direction are required.

The structure is simple and offers few possibilities of getting out of order, thus assuring accurate and dependable operation at all times which is so essential in automatic machines.

The foregoing disclosure is descriptive and not restrictive or limitative of the invention, of which, obviously, embodiments may be constructed, including many modifications, without departing from the spirit and scope of the invention herein set forth and denoted in the appended claims.

Having thus described the invention, what is claimed as new and desired to be secured by Letters Patent, is:

1. In a variable leverage device, an oscillatable shaft, an arm fixed to said shaft, a link pivotally connected to the arm, a lever having a slot therein, a roller on said link positioned in said slot and engaging said lever, a rack having a saddle attached thereto, a roller on said lever engaging said saddle, a pinion engaging said rack, and means to raise or lower the roller on the link in said slot.

2. In a variable leverage device, an oscillatable shaft, an arm fixed to said shaft, a link pivotally connected to the arm, a lever having a slot therein, a roller on said link positioned in said slot and engaging said lever, a rack, means for connecting said rack with said lever, and means to raise or lower the roller on the link in said slot.

3. In a variable leverage device, an oscillatable shaft, an arm fixed to said shaft, a link pivotally connected to the arm, a lever having a slot therein, a roller on said link positioned in said slot and engaging said lever, means actuated by said lever, a pivotally mounted arm, a second link pivoted to said last mentioned arm and pivotally connected to the first link, said last mentioned arm having a segmental portion provided with a plurality of teeth, a pinion engaging said teeth, and means to rotate the pinion to move said arm to raise or lower the position of the roller in said slot.

4. In a variable leverage device, an oscillatable shaft, an arm fixed to said shaft, a link pivotally connected to the arm, a lever, said link having a projection thereon engaging the lever, a pivotally mounted arm having a link pivoted thereto and pivotally connected to said first mentioned link, said last mentioned arm having a segmental portion provided with a plurality of teeth, and a pinion engaging said teeth to move the last mentioned arm to vary the position of said projection on the lever from the fulcrum of the lever.

5. In a variable leverage device, an oscillatable shaft, an arm fixed to said shaft, a first link pivotally connected to the arm, a lever, said link having a projection thereon engaging the lever, a pivotally mounted arm having a second link pivoted thereto and pivotally connected to the first link, means engaging the last mentioned arm to adjust the position of the last mentioned arm to vary the position of the projection on the lever from the fulcrum of the lever, a rack having a saddle attached thereto, means on the lever engaging the saddle, and a pinion engaging the rack.

DANIEL DOUGLAS DEMAREST.
CARL BERENDT.
WILLIAM KARIUS.